US009939300B2

(12) United States Patent
Asano et al.

(10) Patent No.: US 9,939,300 B2
(45) Date of Patent: Apr. 10, 2018

(54) HOT-TYPE FLUID MEASUREMENT DEVICE WITH ELECTRONIC ELEMENTS (71) Applicant: Hitachi Automotive Systems, Ltd., Hitachinaka-shi, Ibaraki (JP)

(72) Inventors: Satoshi Asano, Tokyo (JP); Masahiro Matsumoto, Hitachinaka (JP); Hiroshi Nakano, Hitachinaka (JP); Ryo Sato, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 285 days.

(21) Appl. No.: 14/773,100

(22) PCT Filed: Jan. 10, 2014

(86) PCT No.: PCT/JP2014/050273
§ 371 (c)(1),
(2) Date: Sep. 4, 2015

(87) PCT Pub. No.: WO2014/136468
PCT Pub. Date: Sep. 12, 2014

(65) Prior Publication Data
US 2016/0011031 A1    Jan. 14, 2016

(30) Foreign Application Priority Data
Mar. 5, 2013    (JP) ................. 2013-042501

(51) Int. Cl.
*G01M 15/04*    (2006.01)
*G01F 1/696*    (2006.01)
(Continued)

(52) U.S. Cl.
CPC .............. *G01F 1/696* (2013.01); *G01F 1/692* (2013.01); *G01F 1/6965* (2013.01); *G01F 5/00* (2013.01)

(58) Field of Classification Search
USPC ................ 73/114.32, 114.33, 114.34, 114.35
See application file for complete search history.

(56) References Cited

U.S. PATENT DOCUMENTS 5,107,812 A    4/1992    Takamoto et al.
5,824,895 A *  10/1998   Itsuji ..................... F02D 41/187
                                                73/204.11

(Continued)

FOREIGN PATENT DOCUMENTS

EP    1 637 847 A1    3/2006
EP    2 482 050 A2    8/2012
(Continued)

OTHER PUBLICATIONS

Extended European Search Report issued in counterpart European Application No. 14760368.2 dated Oct. 7, 2016 (Eleven (11) pages).
International Search Report (PCT/ISA/210) dated Apr. 8, 2014, with English translation (six (6) pages), PCT/JP2014/050273.

*Primary Examiner* — Eric S McCall
(74) *Attorney, Agent, or Firm* — Crowell & Moring LLP (57)    ABSTRACT In order to achieve measurement with high precision by suitably correcting a measurement error, a hot-type fluid measurement device includes a module having a passage section and a circuit chamber, a sensor element disposed in the passage section, and a circuit element disposed in the circuit chamber. The circuit element includes a correction section that corrects flow rate information detected by the sensor element from temperature difference information of a temperature of a fluid and a temperature of the module, and at least one temperature of the temperature of the fluid or the temperature of the module.

12 Claims, 10 Drawing Sheets (51) Int. Cl.
    *G01F 1/692*     (2006.01)
    *G01F 5/00*     (2006.01)

(56) References Cited

U.S. PATENT DOCUMENTS

| | | |
|---|---|---|
| 6,209,402 B1 | 4/2001 | Yamada |
| 2003/0101809 A1 | 6/2003 | Matsumura et al. |
| 2004/0069061 A1 | 4/2004 | Watanabe et al. |
| 2007/0125169 A1* | 6/2007 | Nakano ................ G01F 1/6965 |
| | | 73/204.26 |
| 2014/0360262 A1* | 12/2014 | Asano .................... G01F 1/684 |
| | | 73/204.19 |
| 2016/0161313 A1* | 6/2016 | Yamaguchi ............ G01F 1/684 |
| | | 73/114.34 |
| 2017/0023389 A1* | 1/2017 | Hidaka .................... G01F 1/69 |

FOREIGN PATENT DOCUMENTS

| | | |
|---|---|---|
| JP | 61-239119 A | 10/1986 |
| JP | 2-281108 A | 11/1990 |
| JP | 10-197309 A | 7/1998 |
| JP | 2002-162271 A | 6/2002 |
| JP | 2003-166865 A | 6/2003 |
| JP | 2004-12358 A | 1/2004 |
| JP | 2010-181354 A | 8/2010 |
| JP | 2010-216906 A | 9/2010 |
| JP | 2013-24822 A | 2/2013 |

\* cited by examiner

HOT-TYPE FLUID MEASUREMENT DEVICE WITH ELECTRONIC ELEMENTS

TECHNICAL FIELD

The present invention relates to a hot-type fluid measurement device and, particularly, a hot-type fluid measurement device that is installed in an intake system of an automobile engine and measures an intake air flow rate of the engine.

BACKGROUND ART

In recent years, in order to reduce an environmental load of an automobile, an advanced fuel control technique has been required. Thus, it is necessary to accurately grasp an intake air amount to the engine and high-precision of a hot-type fluid measurement device mounted on the automobile is further demanded. Meanwhile, in hot-type fluid measurement devices usually installed in the vicinity of an internal combustion engine, since an ambient temperature of the internal combustion engine of the automobile varies significantly due to various factors, a technique to reduce measurement error due to the temperature is an important technique.

For example, if a temperature of a sensor module is increased by heat generated from the internal combustion engine, it is known empirically that a measurement error is caused by a temperature difference between a temperature of intake air and a temperature of the sensor module. As a related art for controlling the measurement error, there is a technique disclosed by PTL 1.

CITATION LIST

Patent Literature

PTL 1 JP-A-2010-216906

SUMMARY OF INVENTION

Technical Problem

On the other hand, in recent years, in response to the flow of downsizing or low idling of the engine, corresponding to a lower flow rate region has been required for the hot-type fluid measurement device. However, it has been determined by a result of examination by the inventors of this application that in a very low flow rate range in which a flow field in the vicinity of a sensor element of the hot-type fluid measurement device approaches a laminar flow, the measurement error due to the heat generated from the internal combustion engine may depend on something else other than the temperature difference between the temperature of intake air and the temperature of the sensor module. Thus, in PTL 1, room for examination is left with respect to reducing the measurement error due to the heat generated from the internal combustion engine and performing further high-precision measurement.

An object of the invention is to provide a high-precision hot-type fluid measurement device.

Solution to Problem

In order to achieve the object described above, a temperature correction method and a hot-type fluid measurement device including the temperature correction method of the invention have a module including a passage section and a circuit, chamber, a sensor element disposed in the passage section, and a circuit element disposed in the circuit chamber. The circuit element includes a correction section that corrects flow rate information detected by the sensor element from temperature difference information of a temperature of a fluid and a temperature of the module, and at least one temperature of the temperature of the fluid or the temperature of the module.

Advantageous Effects of Invention

According to the invention, it is possible to provide a high-precision hot-type fluid measurement device.

DESCRIPTION OF EMBODIMENTS

Hereinafter, embodiments for carrying out the invention will be described with reference to the drawings.

Figure 1:
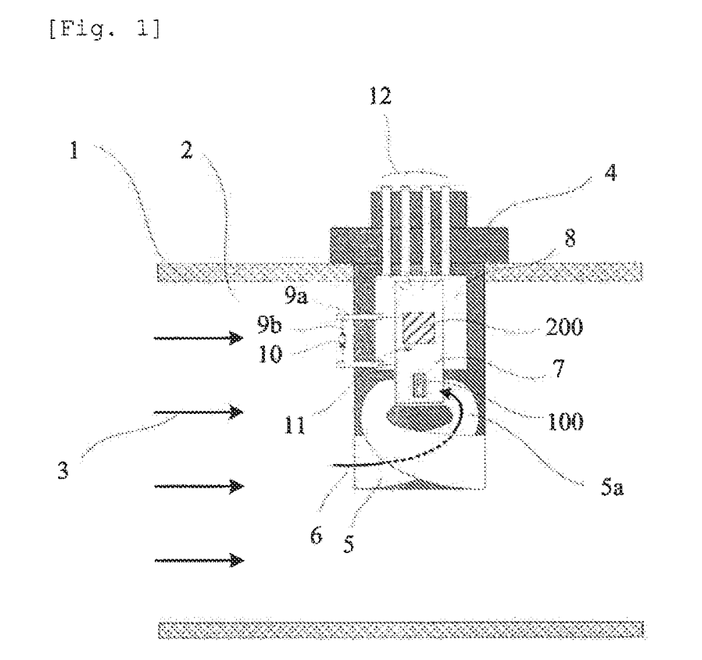
FIG. 1 is a structure of a hot-type fluid measurement device constituting a first example.

A structure of a hot-type fluid measurement device configuring a first example of the invention is illustrated in FIG. 1. A main fluid 3 is capable of flowing in a main passage 2 that is formed by a pipe 1 and a casing 4 is inserted into the main passage 2 for measuring a flow rate of the main fluid 3. A passage 5 into which some of the main fluid 3 is introduced is formed in the casing 4 and a sensor element 100 is disposed so as to be exposed to a branched fluid body 6 introduced into the passage 5. The sensor element 100 is supported by a support body 7 and a circuit element 200 is mounted on the support body 7. The circuit element 200 converts an output signal of the sensor element 100 into flow rate information and outputs the flow rate information to the outside.

Figure 2A:
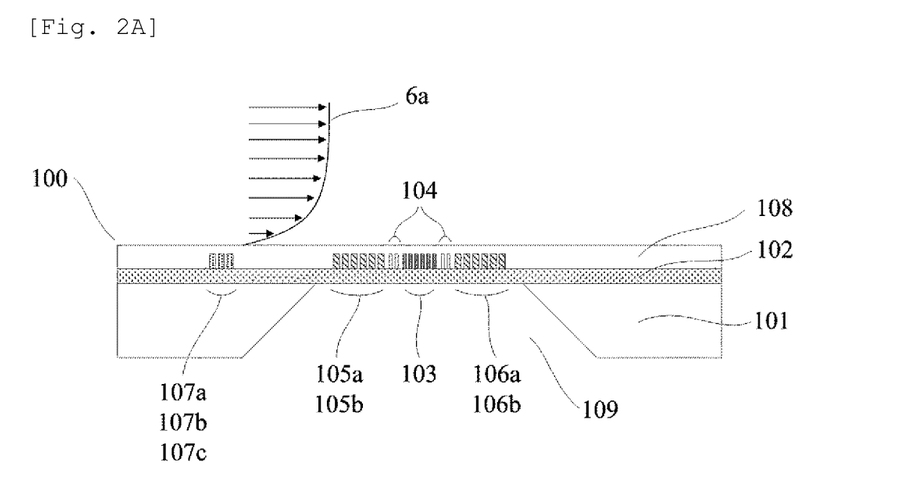
FIG. 2A is a cross-sectional view of a sensor element 100 of the hot-type fluid measurement device constituting the first example.
Figure 2B:
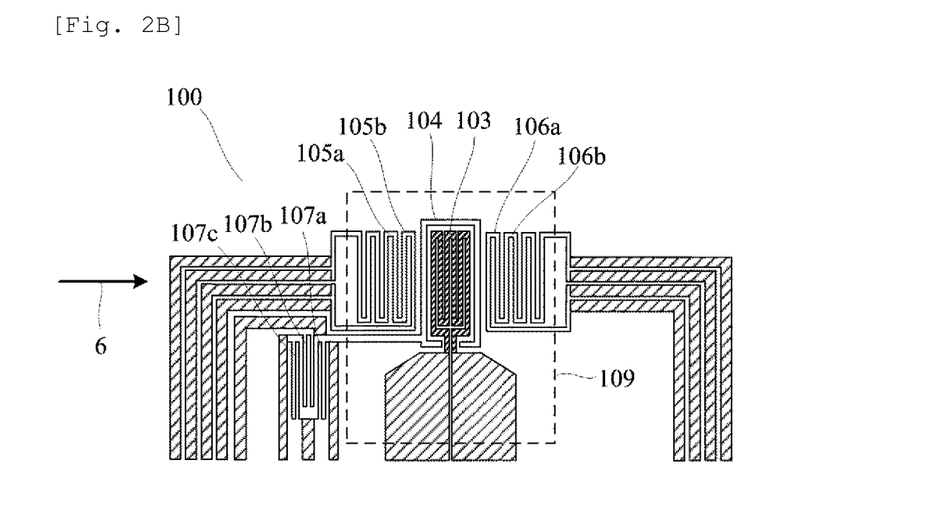
FIG. 2B is a top view of the sensor element 100 of the hot-type fluid measurement device constituting the first example.

Next, a structure of the sensor element 100 is illustrated in FIGS. 2a and 2b. In the sensor element 100, an insulating film 102 is formed on one surface of a silicon substrate 101, an etching process is performed from the other side of the silicon substrate 101, and then a diaphragm 109 is formed. A heating resistor 103, detecting resistors 105 and 106 for detecting a flow rate, and a temperature measuring resistor 104 for measuring a temperature of the heating resistor 103 are formed on the diaphragm 109. In addition, the detecting resistor 105 is disposed on an upstream side of the heating resistor 103 in a main flowing direction of the branched fluid body 6, the detecting resistor 106 is disposed on a downstream side of the heating resistor 103 in the main flowing direction of the branched fluid body 6, and the temperature measuring resistor 104 is disposed in the vicinity of the heating resistor 103. Furthermore, an insulating protective film 108 is formed in an upper portion of the resistors described above and thereby a short between the resistors is prevented or a resistor material is protected from corrosion caused by adhering contaminants and the like contained in the branched fluid body 6 to the sensor element 100. Moreover, it is preferable that a material having a large resistance temperature coefficient is applied to each of the resistors 103 to 106 described above. As the material having a large resistance temperature coefficient, for example, silicon, platinum, tungsten, molybdenum, tantalum, titanium, and the like may be included.

Figure 3:
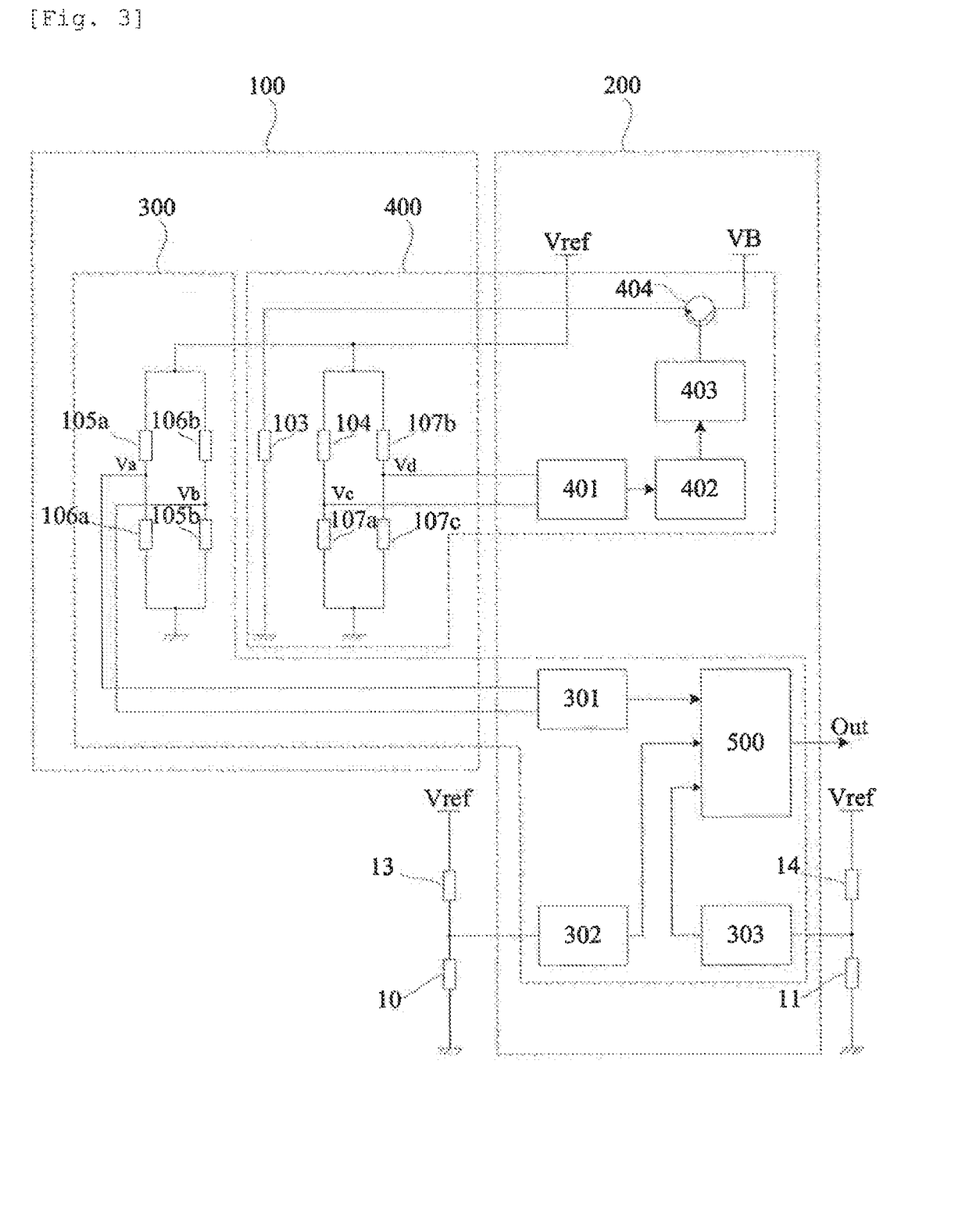
FIG. 3 is a measuring circuit of the hot-type fluid measurement device constituting the first example.

Next, a measuring circuit of the hot-type fluid measurement device is illustrated in FIG. 3. The measuring circuit includes a flow rate detecting circuit 300 and a heating control circuit 400. The flow rate detecting circuit 300 is a circuit for detecting the flow rate and includes a bridge circuit (hereinafter, referred to as a detecting bridge circuit) in which the detecting resistor 105 and the detecting resistor 106 are alternately connected to each other, an AD converter 301, and a correction section 500. Intermediate potentials Va and Vb of the detecting bridge circuit are input into the AD converter 301 and are subject to digital conversion. The correction section 500 derives the flow rate based on a digital value according to Va and Vb.

The heating control circuit 400 is a circuit for controlling the heating resistor 103 at a predetermined temperature and includes a bridge circuit (hereinafter, referred to as a temperature measuring bridge circuit) configured of a temperature sensitive resistor 107 of which a resistance value is changed according to a temperature of the branched fluid body 6 and the temperature measuring resistor 104, the AD converter 401, a control section 402, a DA converter 403, a driving transistor 404, and the heating resistor 103. Intermediate potentials Vc and Vd of the temperature measuring bridge circuit are input into the AD converter 401 and are subject to digital conversion. The control section 402 generates driving amount information of the heating resistor 103 based on the digital value according to Vc and Vd. Driving amount information is converted into a driving signal by the DA converter 403 and the driving transistor and the driving signal is applied to the heating resistor 103.

Here, a measurement error caused by a temperature difference (hereinafter, referred to as $\Delta T$ error) of a temperature Ta of intake air and a temperature Tm of a sensor module will be described with reference to FIGS. 11 and 12.

Figure 11:
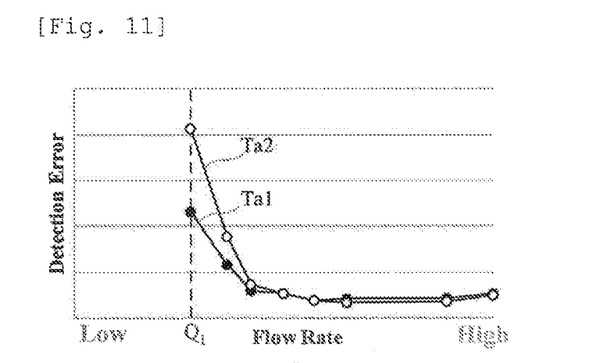
FIG. 11 is an example of a measurement error caused by a temperature difference of intake air and a sensor module.

In a state where the temperature difference between the intake air and the sensor module is constant, $\Delta T$ error of a case where Ta is Ta1 and a case where Ta is Ta2 that is a temperature lower than Ta1 is illustrated in FIG. 11. Moreover, a horizontal axis indicates the flow rate and a vertical axis indicates a magnitude E of the $\Delta T$ error. FIG. 11 illustrates a tendency that the magnitude of the error is changed if Ta is changed even if a temperature difference is constant between the intake air and the sensor module, and the tendency becomes more remarkable as flow rate becomes lower in a low flow rate range in which the flow field approaches a laminar flow.

Figure 12:
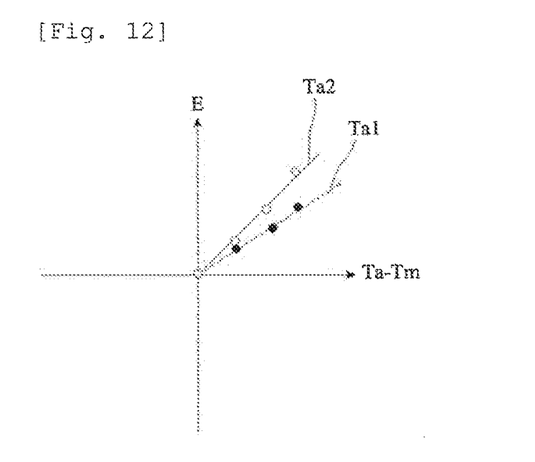
FIG. 12 is a correlation example of the temperature difference and the measurement error of the intake air and the sensor module.

Furthermore, a correlation of the magnitude F of $\Delta T$ error in a flow rate Q1 illustrated in FIG. 11 and the temperature difference between the Intake air and the sensor module is illustrated in FIG. 12. FIG. 12 suggests a need to utilize Ta in addition to (Ta−Tm) to determine the magnitude F of $\Delta T$ error in a certain flow rate Q1. Furthermore, as a reason for $\Delta T$ error having a dependency on Ta, it is possible to point out that a flow velocity gradient of a branched fluid body 6a passing through the vicinity of the sensor element 100 affects a heat transfer amount of air and the detecting resistors 105 and 106.

After receiving the information, in the hot-type fluid measurement device according to the invention, the correction section 500 takes the temperature Ta of the intake air and the temperature Tm of the sensor module, calculates (Ta−Tm), and can correct an output of the AD converter 301 based on the Ta.

The temperature Ta of the intake air is detected by a first temperature sensor configured of a thermistor 10 disposed so as to be exposed to the main fluid 3 on the outside of the casing 4 using a support member 9 and a fixed resistor 13. An output of the first temperature sensor is input into the correction section 500 through an AD converter 302.

Furthermore, in the first example, responsiveness of the thermistor 10 is improved and heat transfer suppression from the casing 4 is achieved by using a support member 9a that improves heat dissipation by being made in a flat planar shape and a support member 9b that improves thermal resistance by being made in an elongated shape.

On the other hand, the temperature Tm of the sensor module is detected by a second temperature sensor configured of a thermistor 11 disposed on the support body 7 and a fixed resistor 14. An output of the second temperature sensor is input into the correction section 500 through an AD converter 303.

Furthermore, implementation of the fixed resistors 13 and 14 may be achieved using discrete components or the resistors may be formed on an inside of the circuit element 200 using a material having a small resistance temperature coefficient.

Figure 4:
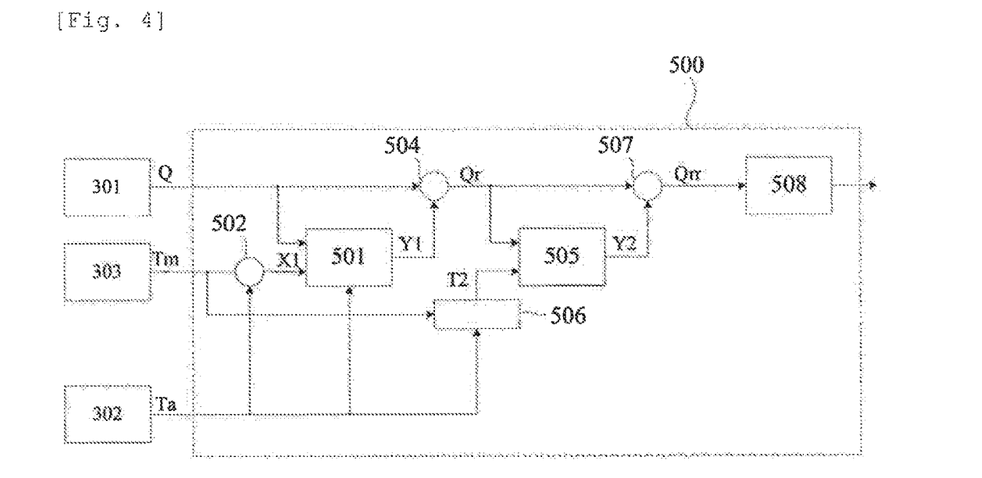
FIG. 4 is a block diagram of a temperature correction section 500 of the hot-type fluid measurement device constituting the first example.

Next, a configuration of the correction section 500 will be described with reference to FIG. 4. The correction section 500 includes a correction amount deriving section 501 that derives a correction amount for correcting $\Delta T$ error, a correction amount deriving section 505 that derives correction amount for correcting a characteristic variation error according to only a temperature difference between one of the temperature of the intake air and the temperature of the sensor module and a reference temperature, a calculator 502 for transmitting temperature information to each correction amount deriving section, a multiplexer 506, calculators 504 and 507 for reflecting the correction amount derived by each correction amount deriving section, and a DA converter 508.

Next, an operation of the correction section 500 will be described with reference to FIG. 4. First, a flow rate signal Q output from the AD converter 301, a temperature signal Ta of the intake air output from the AD converter 302, and a temperature signal Tm of the sensor module output from the AD converter 303 are input into the correction section 500. The correction amount deriving section 501 derives a correction amount for correcting $\Delta T$ error. An output Ta of the AD converter 302 is subtracted by an output Tm of the AD converter. 303 by the calculator 502, and a signal X1 corresponding to the temperature difference of the intake air and the sensor module is generated. The flow rate signal Q, the signal X1 corresponding to the temperature difference generated by the calculator 502, and an output Ta of the AD converter 302 are input into the correction amount deriving section 501 such that the correction amount deriving section 501 derives the correction amount for correcting ΔT error. The correction amount deriving section 501 derives a correction amount Y1 based on Q, X1, and Ta which are input. The correction amount Y1 is added to the flow rate signal Q by the calculator 504 and a corrected signal Qr is generated.

As described above, since the magnitude of ΔT error is dependent on the temperature difference between the intake air and the sensor module, and the temperature of the intake air, a derivation method considering the dependency is required for the derivation of the correction amount Y1. In the first example of the invention, the correction amount Y1 derived by the correction amount deriving section 501 satisfies the following relationship. Here, A(Q) and B(Q) are functions of the flow rate signal Q.

$$\frac{dY1}{dX1} \cong A(Q) + B(Q)Ta \qquad \text{[Expression 1]}$$

In addition, the temperature signal Tm of the sensor module may be input into the correction amount deriving section 501 instead of the temperature signal Ta of the intake air. However, in this case, it is necessary to consider that the correction amount Y1 has dependency on the temperature of the intake air such that a process of estimating the Ta from the Tm and the X1 is added on an inside of the correction amount deriving section 501 and the like.

Next, a signal Qr is input into the correction amount deriving section 505 and the correction amount deriving section 505 derives the correction amount for correcting the characteristic variation error corresponding to only a temperature difference between an ambient temperature and the reference temperature. One of an output Tm of the AD converter 302 and an output Ta of the AD converter 303 is input into the correction amount deriving section 505 through the multiplexer 506 as a temperature signal T2 such that the correction amount deriving section 505 derives the correction amount. The correction amount deriving section 505 derives a correction amount Y2 based on Qr and t2 which are input, the signal Qr is added by a calculator 507, and a corrected signal Qrr is generated.

In addition, a magnitude of the characteristic; variation error is dependent the temperature difference between one of the temperature of the intake air and the temperature of the sensor module, and the reference temperature, and the correction amount Y2 derived from the correction amount deriving section 505 satisfies the following relationship. In addition, C(Qr) is a function of Qr.

$$\frac{dY2}{dT2} \cong C(Qr) \qquad \text{[Expression 2]}$$

Then, the signal Qrr is converted into an analog signal using the DA converter 508 and is output to an external device.

An advantage of the hot-type fluid measurement device configuring the first example is that ΔT error can be corrected with high precision by the operation of the correction section 500. Thus, it is possible to realize flow rate measurement with high precision in a low flow.

Furthermore, in the example, the passage 5 is provided within the casing 4 and the sensor element 100 is disposed on the inside of the passage 5. Thus, an effect that collision or adherence of foreign matter included in the main fluid 3 to the sensor element 100 is suppressed and the flow field around the sensor element 100 is rectified is generated, and thereby reliability and measurement precision are improved.

Furthermore, a curved section 5a is provided further on an upstream side of the passage 5 than the sensor element 100. Thus, the effect that the flow field further on the downstream side than the curved section 5a is rectified is generated and the measurement precision is improved.

Furthermore, as the support member of the thermistor 10, the support member 9a that improves heat dissipation by being made in the flat planar shape and the support member 9b that improves thermal resistance by being made in the elongated shape are used. Thus, improvement of responsiveness of the thermistor 10 and suppression of the heat transfer from the casing 4 are achieved, and measurement precision of the first temperature sensor is improved.

Figure 5:
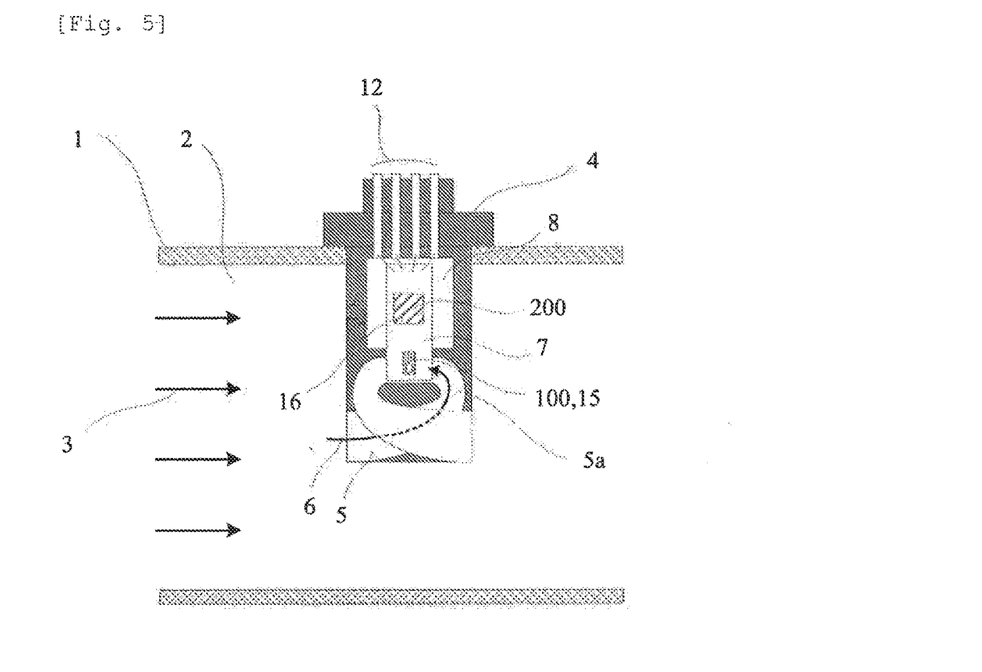
FIG. 5 is a structure of a hot-type fluid measurement device constituting a second example.

Next, a hot-type fluid measurement device configuring a second example will be described with reference to FIGS. 5 to 7.

The hot-type fluid measurement device configuring the second example is configured by including a temperature sensitive resistor 15 formed on the sensor element 100 and a temperature sensitive resistor 16 formed on the inside of the circuit element 200 instead of the thermistors 10 and 11 in the hot-type fluid measurement device configuring the first example. Since main configurations other than these are the same as those of the hot-type fluid measurement device configuring the first example, the description will be omitted.

Figure 6:
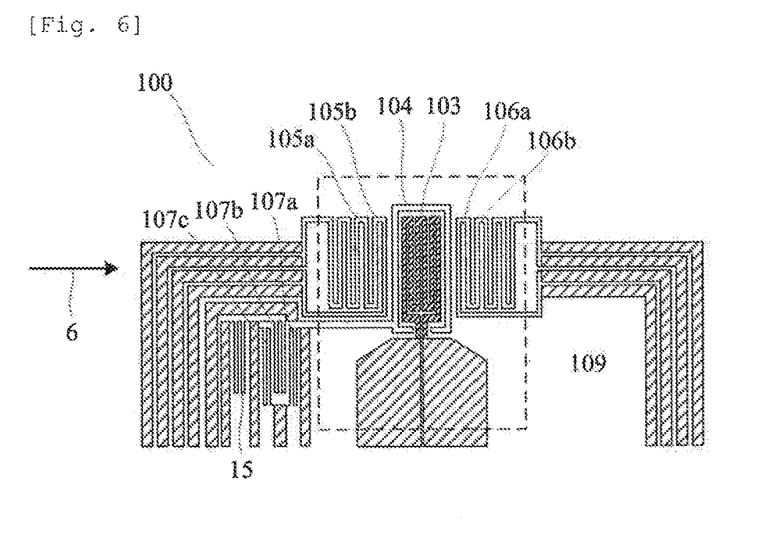
FIG. 6 is a structure of a sensor element 100 of the hot-type fluid measurement device constituting the second example.

A configuration, of a sensor element 100 including the temperature sensitive resistor 15 is illustrated in FIG. 6. In the second example, a temperature Ta of the intake air is detected from the temperature of a branched fluid body 6 is detected. The temperature sensitive resistor 15 is a resistor of which a resistance value is changed according to the temperature. In order to detect the temperature of the branched fluid body 6, the temperature sensitive resistor 15 is mounted on the sensor element 100 so as to be disposed within a passage 5. Furthermore, the temperature sensitive resistor 15 is disposed in a position in which the effects of heat are unlikely to be received from a heating resistor 103 on the sensor element 100 to detect the temperature of the branched fluid body 6. For example, the temperature sensitive resistor 15 may be disposed further on the upstream side than the heating resistor 103 and more preferably, is disposed in a position in which the temperature sensitive resistor 15 does not overlap with the heating resistor 103 in a traveling direction of the branched fluid body 6. In the second example, the temperature sensitive resistor 15 is disposed on the sensor element 100 so as to be adjacent to a temperature sensitive resistor 107. Furthermore, the temperature sensitive resistor 15 and the temperature sensitive resistor 107 may be disposed on a diaphragm 109 together to follow a temperature change of the branched fluid body 6 at high speed.

Figure 7:
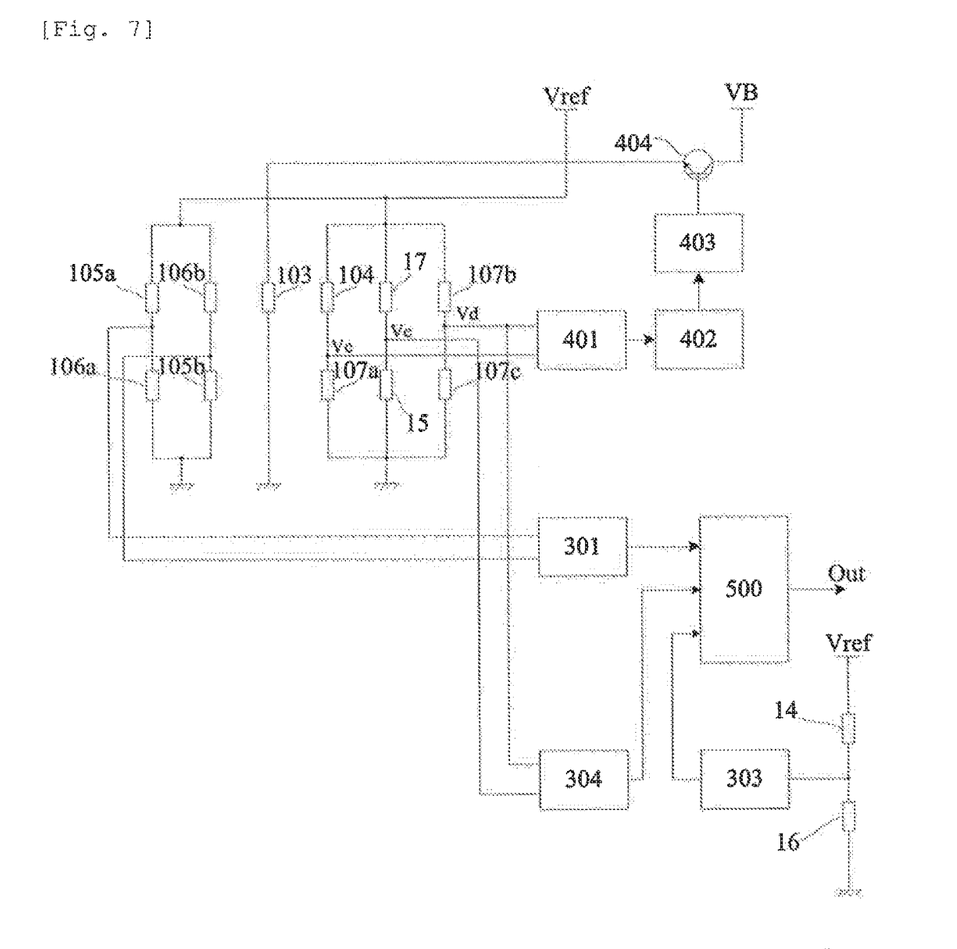
FIG. 7 is a measuring circuit of the hot-type fluid measurement device constituting the second example.

A measuring circuit of the hot-type fluid measurement device configuring the second example is illustrated in FIG. 7. The temperature sensitive resistor 15 is connected to a fixed resistor 17 in series and is connected to the temperature measuring bridge circuit described above in parallel. Then, a midpoint potential Ve of the temperature sensitive resistor 15 and the fixed resistor 17 is input into an AD converter 304 together with an output Vd of the temperature measuring bridge circuit. The AD converter 304 converts a difference voltage between Vd and Ve into a digital signal. Resistance values of the temperature sensitive resistors 15, 107b, and 107c are dependent on the temperature of the branched fluid body 6, and a resistance value of the fixed resistor 17 is not changed. Thus, an output of the AD converter 304 becomes a signal indicating the temperature of the branched fluid body 6.

In addition, implementation of the fixed resistor 17 may be achieved using discrete components or the resistor may be formed on the inside of the circuit element 200 using a material having a small resistance temperature coefficient.

The mounting position of the temperature sensitive resistor 16 is changed, but a circuit operation is the same as that of the thermistor 11 in the hot-type fluid measurement device configuring the first example. For example, the temperature sensitive resistor 16 can be realized as a resistor using polysilicon within the circuit element 200.

An advantage of the hot-type fluid measurement device configuring the second example is that ΔT error can be corrected with high precision by the operation of the correction section 500 similar to the hot-type fluid measurement device configuring the first example. Thus, it is possible to realize flow rate measurement with high precision in a low flow.

Furthermore, in the second example, the temperature Ta of the intake air is measured using the temperature sensitive resistor 15 formed on the sensor element 100. According to the configuration described above, it is possible to reduce a cost for providing the support member 9 and the thermistor 10, and it is possible to improve responsiveness to the temperature by using the temperature sensitive resistor 15 having small heat capacity.

Furthermore, the temperature Tm of the sensor module is measured using the temperature sensitive resistor 16 formed on the circuit element 200. Thus, it is possible to reduce a cost for providing the thermistor 11, and it is possible to improve responsiveness to the temperature by using the temperature sensitive resistor 16 having small heat capacity.

According to the second example, since the temperature Ta of the intake air and the temperature Tm of The sensor module are measured using the temperature sensitive resistor having high responsiveness, it is possible to detect the flow rate with further high precision.

Figure 8:
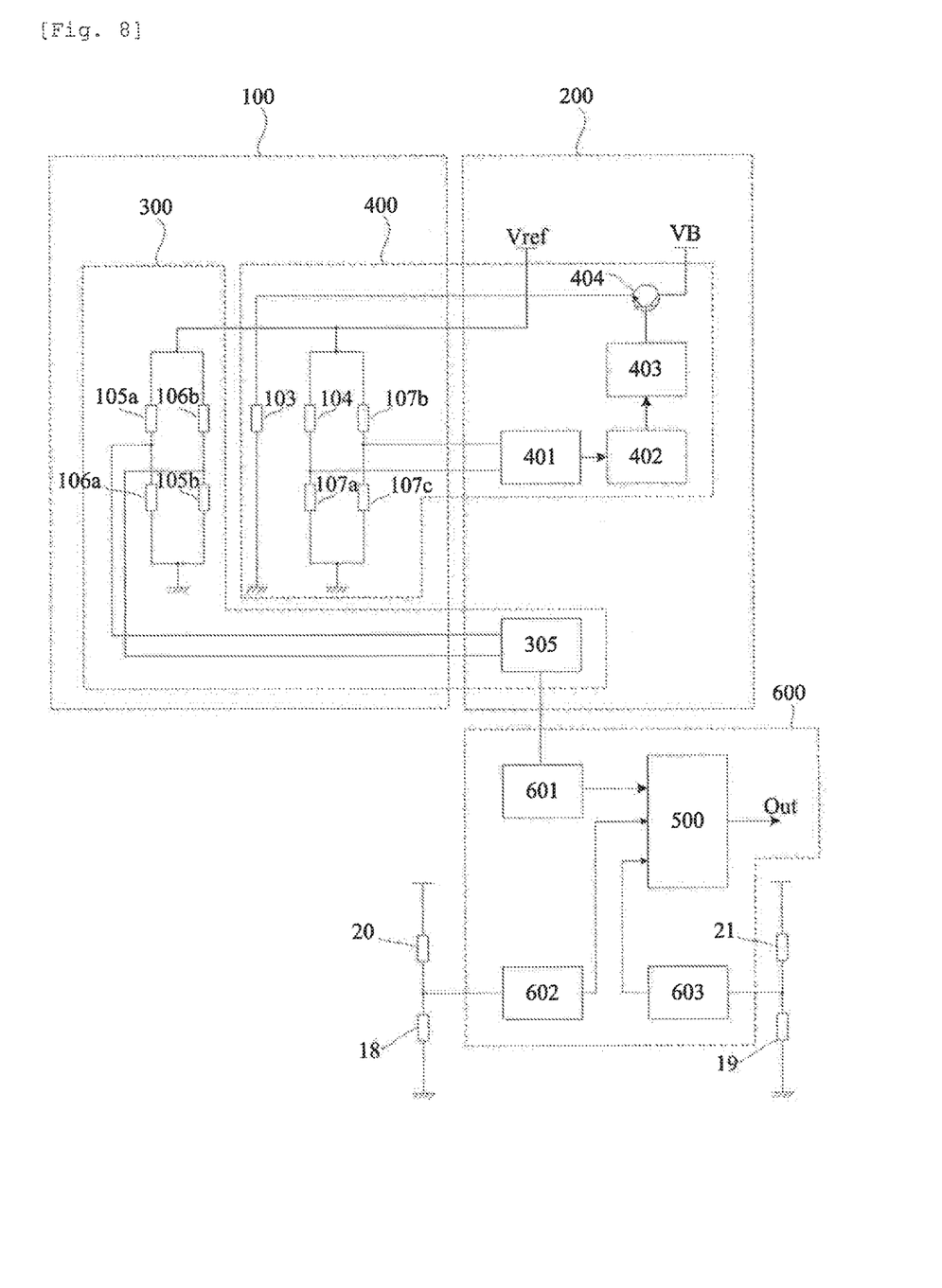
FIG. 8 is a measuring circuit of a hot-type fluid measurement device constituting a third example.

Next, a hot-type fluid measurement device configuring a third example will be described with reference to FIG. 8.

The hot-type fluid measurement device configuring the third example has a configuration in which the correction section 500 in the hot-type fluid measurement device configuring the first example is provided in an electronic control unit 600 (hereinafter, referred to as ECU 600).

Intermediate potentials Va and Vb of a detecting bridge circuit are input into a differential amplifier 305 and output to the ECU 600. An output of the differential amplifier 305 is digital-converted by an AD converter 601 and is input into the correction section 500. Furthermore, the temperature of the intake air is detected by a bridge circuit configured of a thermistor 18 and a fixed resistor 20, and is input into the correction section 500 through an AD converter 602. Similarly, the temperature of the sensor module is detected by a bridge circuit configured of a thermistor 19 and a fixed resistor 21, and is input into the correction section 500 through an AD converter 603. Then, the correction section 500 executes the correcting process described above in the first example.

In the first example, in the hot-type fluid measurement device, correction of the flow rate signal Q is performed and the corrected flow rate signal is transmitted to the outside (ECU 600), but in the third example, the flow rate signal Q, the temperature signal Ta of the intake air, and the temperature signal Tm of the module are transmitted to the ECU 600, and the correction is performed in the correction section 500 provided in the ECU 600. In addition, as illustrated in the third example, it is not necessary for all of the sensor element 100, the circuit element 200, the correction section 500, means for measuring the temperature of the intake air, and means for measuring the temperature of the sensor module to be included in a single device. For example, the sensor element 100, the circuit element 200, and the means for measuring the temperature of the sensor module are included in the flow rate sensor, temperature measuring means of air is provided alone, and only the correction section 500 that performs correction using the signals detected by these members may be provided in the ECU 600.

Next, a hot-type fluid measurement device configuring a fourth example will be described with reference to FIGS. 9 and 10.

Figure 9:
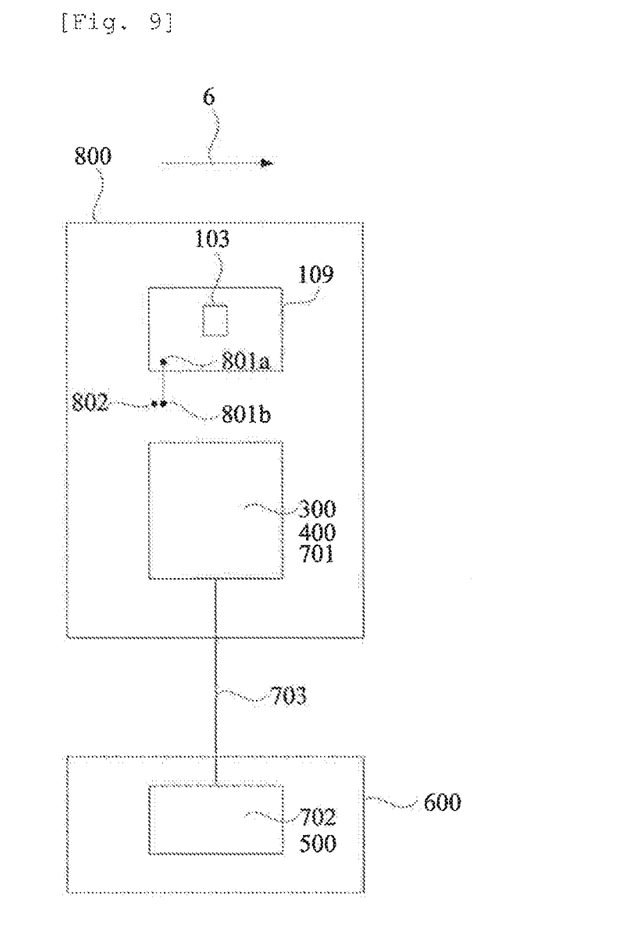
FIG. 9 is a structure of a chip 800 of a hot-type fluid measurement device constituting a fourth example.

As illustrated in FIG. 9, a flow rate detection element in The fourth example is configured such that a flow rate detection section and a circuit section are integrally formed in a semiconductor chip 800 configured of a silicon substrate. Similar to the sensor element 100 in the first example, the flow rate detection section in the fourth example has a membrane (diaphragm in the first example) of which a part is a thin film shape by forming a hollow section or a concave section by performing an etching process on the silicon substrate, a heating body which is provided on the membrane, and a temperature detector which is provided on an upstream side and a downstream side of the heating body. A part or all of the temperature detectors is configured to be formed on the membrane.

The hot-type fluid measurement device configuring the fourth example has a configuration in which the sensor element 100 and the circuit element 200 are integrated in one chip 800. In addition, means for measuring a temperature difference between the intake air and the sensor module, and means for measuring the temperature of the sensor module are configured to be provided in the chip 800.

A configuration of the chip 800 is illustrated in FIG. 9. The chip 800 has a diaphragm 109, a flow rate detecting circuit 300, a heating control circuit 400, a thermocouple 801, a temperature sensitive resistor 802, and a transmission section 701. Furthermore, since configurations of the diaphragm 109, the flow rate detecting circuit 300, and the heating control circuit 400 are the same as those of the first example, the description will be omitted.

One contact point 801a of the thermocouple 801 is provided on the inside of the diaphragm 109 and the other contact point 801b is provided on the outside of the diaphragm 109. Thus, the contact point 801a follows the temperature of the branched fluid body 6 passing through the diaphragm 109 and the contact point 801b follows the temperature of the chip 800, that is, the temperature of the sensor module on which the chip 800 is mounted. Since the thermocouple generates a voltage according to a temperature difference generated between two contact points, it is possible to measure the temperature difference between air and the sensor module by the configuration described above.

Furthermore, the contact point 801b and the temperature sensitive resistor 802 are disposed adjacent to each other. Thus, the temperature of the contact point 801b can be substantially equal to the temperature of the temperature sensitive resistor 802.

According to the configuration described above, it is possible to measure the temperature difference between the air and the sensor module, and the temperature of the sensor module. Furthermore, it is possible to derive the temperature of the air from the pieces of temperature information.

Figure 10:
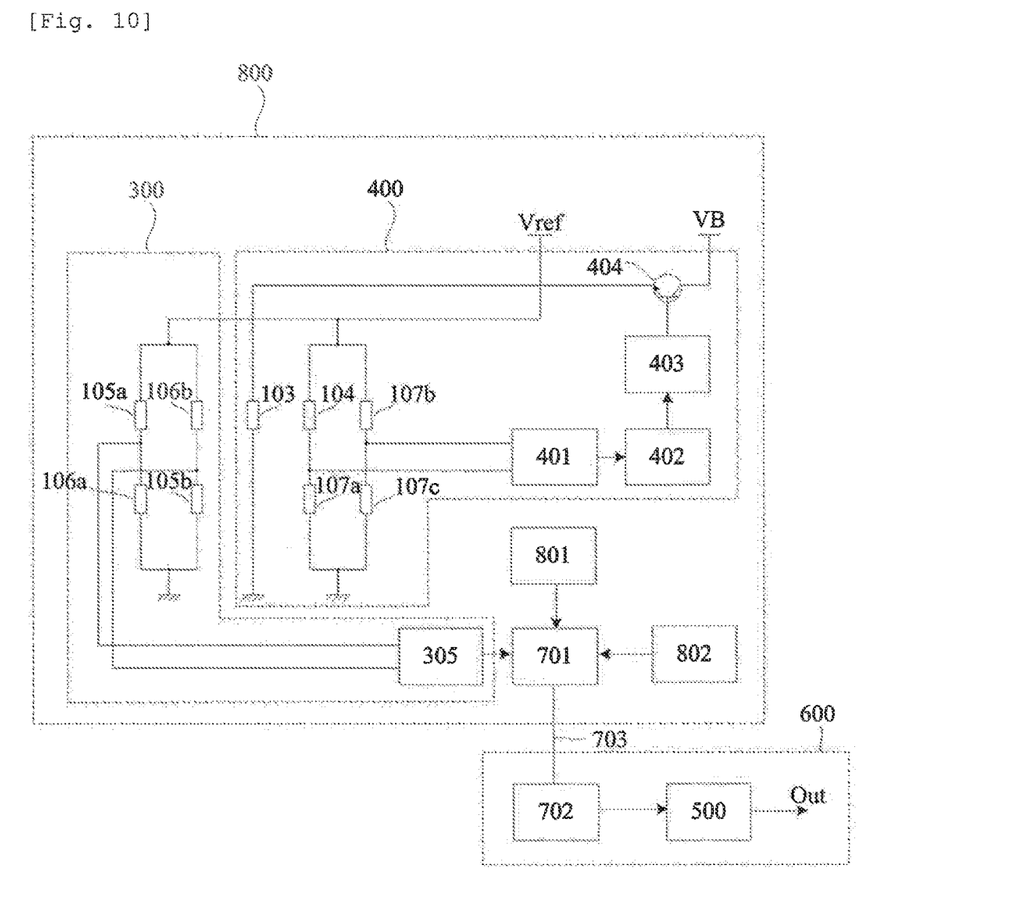
FIG. 10 is a measuring circuit of the hot-type fluid measurement device constituting the fourth example.

A measuring circuit of the hot-type fluid measurement device configuring the fourth example is illustrated in FIG. 10. Measurement information that is detected by the flow rate detecting circuit 300, the thermocouple 801, and the temperature sensitive resistor 802, respectively are output from the transmission section 701 and are transmitted to a receiving section 702 provided the ECU 600 through a harness 703. Then, the correction section 500 provided in the ECU 600 executes the correction operation described above using information received by the receiving section 702.

For the harness 703, a dedicated harness may be prepared for each piece of measurement information that is detected by the flow rate detecting circuit 300, the thermocouple 801, and the temperature sensitive resistor 802, respectively. In addition, it is possible to reduce the number of harnesses by using a predetermined communication protocol. Furthermore, it is possible to reduce the number of harnesses by applying a wireless communication technique.

Furthermore, as an advantage obtained by using a digital communication technique in the signal transmission to the ECU 600, it is possible to expect an effect of improving the reliability of transmission information. The harness mounted on an automobile is affected by various types of electromagnetic noise emitted from devices mounted on the automobile and there is a risk that noise superimposed on the harness affect transmission information. On the other hand, since the digital communication can easily apply an error detection technique and the like, it is possible to improve the reliability of transmission information.

Furthermore, in the first example, the correction section 500 uses the flow rate signal Q, the temperature signal Ta of the intake air, and the temperature difference (Ta−Tm) between the intake air and the sensor module as parameters for deriving the correction amount. On the other hand, in the fourth example, the correction section 500 uses the flow rate signal Q, the temperature signal Tm of the sensor module, and the temperature difference (Ta−Tm) between the intake air and the sensor module as input. In the example, the temperature Ta of the air is derived from the temperature difference between the air and the sensor module, and the temperature of the sensor module, and thereby the same parameters as the correction section 500 in the first example are used and the correction operation is realized.

Furthermore, as a modification example of the fourth example, the correction section 500 may be integrated with the chip 800. In this case, it is possible to realize the correcting process according to an individual variation of the chip 800 and it is possible to omit the transmission section 701 and the receiving section 702. Furthermore, it is also possible to reduce a signal processing amount of the ECU 600.

In each example described above, the functions A(Q) and B(Q) that are used when the correction amount deriving section 501 derives the correction amount Y1 may be stored in a memory device as map data or may be obtained by an arithmetic operation and a derivation medium is not specifically limited. Furthermore, the function C(Qr) that is used when the correction amount deriving section 505 derives the correction amount Y2 is also the same.

Furthermore, in the above description, the correction amount deriving section 501 and the correction amount deriving section 505 have the configurations in which the process is performed in series, but the process may be performed in parallel.

Furthermore, in each embodiment described above, the hot-type fluid measurement device uses the resistor having a high resistance temperature coefficient for the detection element, for example, may use the thermocouple. Similarly, the hot-type fluid measurement device can obtain the same effects even if a detection element using thermoelectric conversion effects such as a Seebeck effect, a Thomson effect, and a Peltier effect is used.

REFERENCE SIGNS LIST

1: pipe, 2: main passage, 3: main fluid, 4: casing, 5: passage, 6: branched fluid body, 7: support body, 8: circuit chamber, 9: support member, 10: thermistor, 11: thermistor, 12: connector, 13: fixed resistor, 14: fixed resistor, 15: resistor, 16: resistor, 17: fixed resistor, 18: thermistor, 19: thermistor, 20: fixed resistor, 21: fixed resistor, 100: sensor element, 101: silicon substrate, 102: insulating film, 103: heating resistor, 104: temperature measuring resistor, 105: detecting resistor, 106: detecting resistor, 107: temperature sensitive resistor, 108: protective film, 109: diaphragm, 200: circuit element, 300: flow rate detecting circuit, 301: AD converter, 302: AD converter, 303: AD converter, 304: AD converter, 305: amplifier, 400: heating control circuit, 401: AD converter, 402: control section, 403: DA converter, 404: transistor, 500: correction section, 501: correction amount deriving section, 502: calculator, 504: calculator, 505: correction amount deriving section, 506: multiplexer, 507: calculator, 508: DA converter, 600: ECU, 601: AD converter, 602: AD converter, 603: AD converter, 700: communication unit, 701: transmission section, 702: receiving section, 703: cable, 800: chip, 801: thermocouple, 802: resistor

The invention claimed is:

1. A hot-type fluid measurement device comprising:
 a module that includes a passage section and a circuit chamber;
 a sensor element that is disposed in the passage section; and
 a circuit element that is disposed in the circuit chamber,
 wherein the circuit element includes a correction section that corrects flow rate information detected by the sensor element from temperature difference information of a temperature of a fluid and a temperature of the module, and at least one of the temperature of the fluid and the temperature of the module; and
 wherein the sensor element has a diaphragm constructed in a semiconductor substrate, a heating resistor provided on the diaphragm, and a plurality of temperature detectors provided on an upstream side and a downstream side of the heating resistor on the diaphragm,
 wherein the sensor element has a first temperature sensor measuring the temperature of the fluid and a second temperature sensor measuring the temperature of the module, and wherein the second temperature sensor is provided on an inside of the circuit chamber.

2. The hot-type fluid measurement device according to claim 1,
 wherein the first temperature sensor is provided on the semiconductor substrate.

3. The hot-type fluid measurement device according to claim 1,
wherein the semiconductor substrate has a bridge circuit formed of a first thermosensitive resistor of which a resistance value changes according to a temperature of the heating resistor, a second thermosensitive resistor of which a resistance value changes according to the temperature of the fluid, a third thermosensitive resistor of which a resistance value changes according to the temperature of the fluid, and a fourth thermosensitive resistor of which a resistance value changes according to the temperature of the fluid,
wherein the circuit element has a control section that controls a heating amount of the heating resistor using an output of the bridge circuit, and
wherein the first temperature sensor is configured of at least one or more of the second thermosensitive resistor, the third thermosensitive resistor, and the fourth thermosensitive resistor.

4. The hot-type fluid measurement device according to claim 1,
wherein the circuit element has a measuring circuit that inputs a signal from the sensor element and outputs a measurement result of a predetermined parameter of fluid, and integrates the measuring circuit and the second temperature sensor on the same semiconductor chip.

5. The hot-type fluid measurement device according to claim 1,
wherein the first temperature sensor is provided in a position that is outside of the module and exposed to the fluid.

6. The hot-type fluid measurement device according to claim 5,
wherein the first temperature sensor is supported by a support member protruded from the module and the support member includes a heat transfer suppressing section that suppresses heat transfer from the module to the first temperature sensor.

7. A hot-type fluid measurement device comprising:
a module that includes a passage section and a circuit chamber;
a sensor element that is disposed in the passage section; and
a circuit element that is disposed in the circuit chamber,
wherein the circuit element includes a correction section that corrects flow rate information detected by the sensor element from temperature difference information of a temperature of a fluid and a temperature of the module, and at least one temperature of the temperature of the fluid and the temperature of the module; and
wherein the correction section has at least one memory data of a first correction memory data that stores a first correction amount corresponding to a temperature difference between the temperature of fluid and the temperature of the module, and a second correction memory data that stores a second correction amount corresponding to at least one temperature of the temperature of the fluid or the temperature of the module.

8. A hot-type fluid measurement device comprising:
a module that includes a passage section and a circuit chamber;
a sensor element that is disposed in the passage section; and
a circuit element that is disposed in the circuit chamber,
wherein the circuit element includes a correction section that corrects flow rate information detected by the sensor element from temperature difference information of a temperature of a fluid and a temperature of the module, and at least one temperature of the temperature of the fluid and the temperature of the module; and
wherein the correction section includes calculation means for calculating the correction amount from the temperature difference of the fluid and the module, and at least one temperature of the temperature of the fluid and the temperature of the module.

9. A hot-type fluid measurement device comprising:
a module that includes a passage section and a circuit chamber;
a sensor element that is disposed in the passage section; and
a circuit element that is disposed in the circuit chamber,
wherein the circuit element includes a correction section that corrects flow rate information detected by the sensor element from temperature difference information of a temperature of a fluid and a temperature of the module, and at least one temperature of the temperature of the fluid and the temperature of the module; and
wherein the sensor element has a diaphragm configured on a semiconductor substrate, a heating resistor provided on the diaphragm, and a plurality of temperature detectors provided on an upstream side and a downstream side of a heating resistor on the diaphragm,
wherein the sensor element and the circuit element are integrated on the same semiconductor substrate and the semiconductor substrate has a module temperature sensor that measures the temperature of the module, and
the circuit element has a measuring circuit that inputs a signal from the sensor element and outputs a measurement result of a predetermined parameter of the fluid.

10. The hot-type fluid measurement device according to claim 9,
wherein the semiconductor substrate has a plurality of thermocouples, and
wherein the plurality of temperature detectors are respectively contact points of one side of the thermocouple.

11. The hot-type fluid measurement device according to claim 10,
wherein the plurality of thermocouples has thermocouples of which the contact points of the other side are provided on an outside of the diaphragm, and
wherein the temperature difference between the temperature of the fluid and the temperature of the module is measured by thermocouples of which the contact points of the other side are provided on the outside of the diaphragm.

12. The hot-type fluid measurement device according to claim 11,
wherein the contact points on the other side, of thermocouples of which the contact points on the other side are provided on the outside of the diaphragm and the module temperature sensor are arranged to be close.

* * * * *